Oct. 29, 1963  D. H. POLZIN  3,108,482
DRIVE MECHANISM FOR AN AGRICULTURAL IMPLEMENT
Filed April 10, 1962
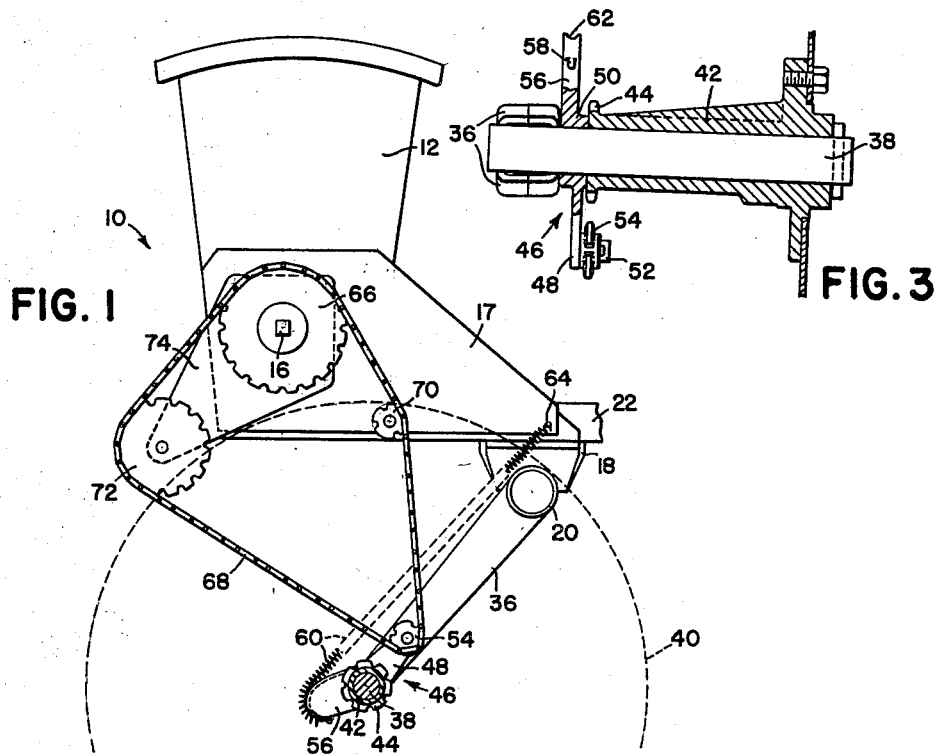
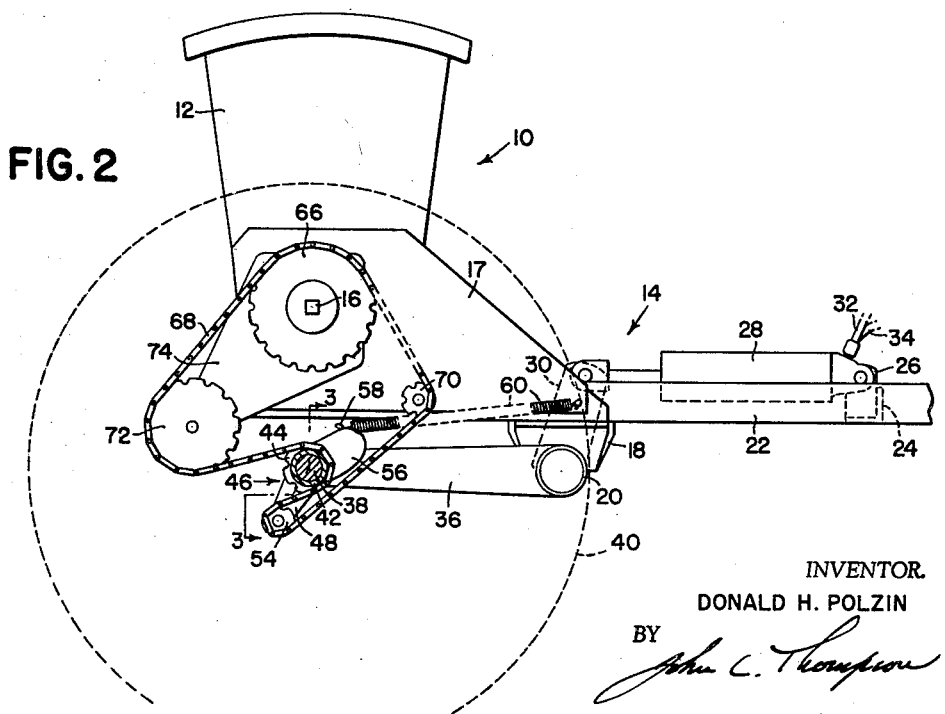
INVENTOR.
DONALD H. POLZIN
BY
*John C. Thompson*
AGENT United States Patent Office 3,108,482
Patented Oct. 29, 1963

3,108,482
DRIVE MECHANISM FOR AN AGRICULTURAL IMPLEMENT
Donald H. Polzin, Horicon, Wis., assignor to Deere & Company, Moline, Ill., a corporation of Delaware
Filed Apr. 10, 1962, Ser. No. 186,381
7 Claims. (Cl. 74—221)

The present invention relates generally to agricultural implements and more particularly to drive mechanisms for grain drills, planters, and similar implements.

It is an object of the present invention to provide drive means for agricultural implements of the type having a transverse rockshaft to which land wheels are secured, whereby rotation of the rockshaft causes the implement to be lowered from an inoperative position to an operative position or vice-versa; the drive means being interconnected with the land wheels in such a fashion that when the implement frame is lowered the drive means causes a part carried by the implement to be rotated in response to the corresponding rotation of the land wheels when the implement is moved forwardly, and when the implement frame is raised the drive means no longer causes rotation of said part. More specifically it is an object to provide means in a grain drill to actuate the grain feeds only when the furrow openers (which are carried by the implement frame), are lowered into their operative furrow opening positions.

Another object of this invention is to provide drive means which are of rugged construction, reliable in operation, and low in cost.

These and other objects and advantages of the present invention will be apparent to those skilled in the art after a consideration of the following detailed description, taken in conjunction with the accompanying drawings in which:

FIG. 1 is a side view of a grain drill in which the principles of the present invention have been incorporated, the grain drill being shown in its raised transport position.

FIG. 2 is a side view similar to FIG. 1 showing the grain drill in its lowered drilling position.

FIG. 3 is a cross-section taken along lines 3—3 of FIG. 2.

The principles of the present invention have been shown by way of illustration as embodied in a grain drill, indicated generally at 10, having a grain box or hopper 12 mounted on a frame 14. The grain drill is provided with conventional furrow openers and grain feeds (not illustrated), the grain feeds being driven by shaft 16. The furrow openers are rigidly secured to the frame 14.

The frame 14 includes first frame members in the form of end plates 17 which are secured to a transversely mounted channel member 18. A rockshaft 20 is rotatably secured to the channel member 18. Rigidly secured to the channel member 18 and other frame parts is a forwardly extending draft frame means 22. Mounted on the draft frame means 22 is a cross channel member 24 to which is secured an upstanding bracket 26. The forward end of a double acting hydraulic cylinder 28 is pivotally secured to the upstanding bracket while the other end of the cylinder is pivotally secured to an upstanding rock arm 30 which is rigidly secured to the rockshaft 20. The cylinder 28 is connected to hydraulic lines 32, 34 to a source of fluid under pressure (not shown).

A plurality of rearwardly extending depending arms 36 (only one being shown in the drawings) are rigidly secured at their forward ends to the rockshaft 20, and each arm 36 carries on its rearward end an outwardly disposed axle 38. Mounted about the axle is a land wheel 40 (shown in phantom) which is journaled about the axle 38 by means of an elongated hub 42. The hub 42 is provided with a sprocket portion 44 at its inner end.

Rotatably mounted on the axle 38 between the hub 42 and the depending arm 36 is a cam and spring idler tension mechanism indicated generally at 46. This mechanism is provided with a radially extending arm 48 which projects from the central portion 50 of the idler tension mechanism 46. The arm 48 is provided with an outwardly extending axle 52 about which is journaled a first idler sprocket 54. Mounted on the other side of the central portion 50 is a cam member 56 which is provided with an upstanding finger 58 which is adapted to receive one end of a helical spring 60. The cam is provided with a groove 62 which forms a seat for the spring when the grain drill is in its transport position as illustrated in FIG. 1. The other end of the helical spring is secured to the frame by conventional fastener means 64.

A driven sprocket 66 is mounted about the shaft 16 and is adapted to be driven by the driving sprocket 44 through a drive chain 68 when the implement is in the position illustrated in FIG. 2. The drive chain passes over the driving sprocket 44, around the first idler sprocket 54, about a second idler sprocket 70 (which is rotatably mounted on the first frame member or end plate 17), around the driven sprocket 66, and finally around a third idler sprocket 72 (which is rotatably mounted on an auxiliary frame member 74 which is secured in a conventional manner to the first frame member 17).

The operation of applicant's drive mechanism is an follows: When the implement is in the transport position as illustrated in FIG. 1, the drive chain 68 is held in a taut position away from the driving sprocket 44 by the first idler sprocket 54 and thus the grain feeds are not driven by the shaft 16. To drive the shaft 16 it is necessary to retract the cylinder 28 which causes the frame 14 to be lowered into a drilling position due to the movement of the landwheels 40 with respect to the frame. The chain 68 is held in its taut position by the first idler sprocket 54, the spring 60 causing the cam and spring idler tension mechanism 46 to rotate in a clockwise direction as the frame is lowered until the chain 68 and idler mechanism assume the position illustrated in FIG. 2. In the frame-lowered position the chain 68 is drivingly engaged by drive sprocket 44. Forward motion of the grain drill will then cause the sprocket to rotate in a clockwise direction which in turn causes the shaft 16 to be rotated in the counterclockwise direction.

To disconnect the feed drive it is only necessary to extend the hydraulic cylinder 28. This causes the frame to be raised relative to the wheels 40 through rotation of the rock arm 30, rockshaft 20 and arms 36. As the frame is raised the chain 68, which is of a constant length, causes the idler mechanism 46 to rotate in a counterclockwise direction until the first idler sprocket no longer holds the chain in overlying driving relation to the sprocket 44.

Having described the preferred form of my invention, it is to be understood that my invention is not to be limited to the particular details shown and described above, but that, in fact, widely different means may be employed in the practice of the broader aspects of my invention. For example, mechanical extensible and retractable means may be substituted for my hydraulic means. Similarly, by changing the geometrical configuration of the sprockets it may be possible to eliminate either the second idler sprocket, or the third idler sprocket, or both.

What is claimed is:

1. In a grain drill having a frame, land wheels movably carried by the frame, means to move the land wheels generally vertically relative to the frame to cause the frame to be moved from either a raised inoperative position or a lowered operative position to the other of said positions, a grain feed driving shaft carried by said frame, sprocket means secured to said grain feed driving shaft and about the axis of one of said land wheels, chain drive means operatively interconnecting said sprockets when the frame is in a lowered operative position and responsive to the rotation of the land wheels when the grain drill is moved forwardly to cause the shaft to be rotated, and means responsive to the movement of the frame from a lowered operative position to a raised inoperative position to disengage the chain from one of said sprockets, whereby the shaft is not rotated.

2. In a grain drill, a frame, a grain feed driving shaft carried by said frame, a transverse rockshaft rotatably carried by said frame, said rockshaft being provided with depending arm means, land wheels rotatably carried by said arm means at a portion remote from said rockshaft, means to rotate said rockshaft to cause the land wheels to move generally vertically with respect to said frame whereby the frame is moved from either a raised inoperative position or a lowered operative position to the other of said positons, sprocket means secured to said grain feed driving shaft and about the axis of one of said land wheels, chain drive means interconnecting said sprockets when the frame is in its lowered operative position to cause the grain feed driving shaft to be rotated in response to rotation of the land wheel, and means to disengage said chain drive means from one of said sprockets in response to movement of the frame from its lowered operative position to its raised inoperative position.

3. In a grain drill, a frame, a grain feed driving shaft carried by said frame, a transverse rockshaft rotatably mounted on said frame, a depending arm having one end rigidly secured to said rockshaft, a transversely extending axle mounted on the other end of said arm, land wheel means rotatably disposed about said axle, said land wheel means including a sprocket portion, means to rotate said rockshaft to cause the land wheels to move generally vertically with respect to said frame whereby the frame is moved from either a raised inoperative position or a lowered operative position to the other of said positions, drive means disposed between said sprocket portion and said grain feed driving shaft, said drive means being held from engagement with the sprocket when the frame is in its raised inoperative position, and means responsive to movement of the frame from its raised inoperative position to cause the drive means to become engaged with said sprocket, whereby said grain feed driving shaft is caused to be rotated when the grain drill is moved forwardly.

4. The invention set forth in claim 3 in which the drive means is a chain of fixed length.

5. The invention set forth in claim 4, in which said engaging means includes a cam and idler spring tension mechanism rotatably disposed about said axle, said mechanism including a radially outwardly projecting arm, an idler sprocket rotatably mounted on said last-mentioned arm and in engagement with said drive chain, and means rotatably biasing said mechanism whereby said idler sprocket holds the drive chain taut and brings it into engagement with said sprocket when the frame is lowered into its operative position.

6. A grain drill comprising a frame, a grain box mounted on the frame, said grain box having a grain feed driving shaft disposed therein, a rockshaft mounted transversely on said frame, a rock arm secured to said rockshaft, a hydraulic cylinder secured at one end to said rock arm, the other end of said cylinder being secured to an upstanding bracket on said frame, a depending arm secured at its upper end to said rockshaft, the lower end of said arm being provided with a transversely disposed axle, a ground engaging wheel mounted on said axle, said wheel having a hub disposed about said axle, means to cause the cylinder to extend and retract thereby causing the frame to move from either a raised inoperative position or a lowered operative position to the other of said positions, means responsive to the movement of the frame to cause the feed shaft to be driven in response to rotation of the ground engaging wheel when the frame is in its lowered operative position and not to be driven when the frame is in its raised inoperative position, said means comprising a drive sprocket secured to the wheel hub, a driven sprocket secured to one end of said feed shaft, a cam and spring idler tension mechanism rotatably secured about said axle, said mechanism including a radially outwardly projecting spring biased arm, an idler sprocket rotatably secured to said arm, and a spring mechanism biasing said arm from a first position to a second position, and a drive chain interconnecting said driven sprocket and said idler sprocket, the parts being so arranged and constructed that the chain is held in a position out of engagement with the drive sprocket when the frame is in its raised inoperative position, and is forced into engagement with the drive sprocket by the action of the spring biased arm when the frame is in its lowered operative position.

7. In combination with an apparatus of the class described having a frame, ground-engaging wheels movably carried by the frame, means to move the ground-engaging wheels generally vertically relative to the frame to cause the frame to be moved from either a raised inoperative position or a lowered operative position to the other of said positions, and a drivable shaft carried by said frame; means responsive to the movement of the frame to cause the drivable shaft to be driven in response to rotation of one of the ground-engaging wheels when the frame is in its lowered operative position and not to be driven when the frame is in its raised inoperative position, said means comprising: rotary drivable means fixed relative to said frame and said drivable shaft and drivingly interconnected with said drivable shaft, rotary driving means fixed relative to one of said ground-engaging wheels and movable generally vertically relative to said frame with said one ground-engaging wheel, said rotary driving means being drivingly interconnected with said one ground-engaging wheel, and flexible drive transmitting means operatively interconnecting said rotary means when the frame is in a lowered operative position and responsive to the rotation of said one ground-engaging wheel when the apparatus is moved forwardly to cause the shaft to be rotated, and means responsive to the movement of the frame from a lowered operative position to a raised inoperative position to disengage said flexible drive transmitting means from one of said rotary means whereby the shaft is not rotated.

References Cited in the file of this patent

UNITED STATES PATENTS

| 1,486,930 | Smith | Mar. 18, 1924 |
| 2,523,159 | Stone | Sept. 19, 1950 |
| 2,657,583 | Neighbour | Nov. 3, 1953 |